United States Patent [19]

Horner et al.

[11] Patent Number: 5,016,976

[45] Date of Patent: May 21, 1991

[54] MODIFIED COMPACT 2F OPTICAL CORRELATOR

[75] Inventors: Joseph L. Horner, Belmont; Kenneth H. Fielding, Hanscom Air Force Base; Charles K. Makekau, Bedford, all of Mass.

[73] Assignee: The United States of America as represented by the Secretary of the Air Force, Washington, D.C.

[21] Appl. No.: 502,486

[22] Filed: Mar. 30, 1990

[51] Int. Cl.$^5$ .................. G02B 27/46; G06K 9/00
[52] U.S. Cl. .................. 350/162.13; 350/162.15; 364/822
[58] Field of Search .............. 350/162.12, 162.13, 350/162.15; 364/822, 825

[56] References Cited

U.S. PATENT DOCUMENTS

| | | | |
|---|---|---|---|
| 3,240,108 | 3/1966 | Lehan et al. | 350/162.12 |
| 3,630,596 | 12/1971 | Watkins | 350/162.12 |
| 3,809,478 | 5/1974 | Talbot | 350/162.12 |
| 4,588,260 | 5/1986 | Horner | 350/162.13 |
| 4,765,714 | 8/1988 | Horner et al. | 350/162.13 |

OTHER PUBLICATIONS

Flavin, Mary A. et al., "Amplitude Encoded Phase-Only Filters", Applied Optics, vol. 28, No. 9, May 1, 1989, pp. 1692-1696.

*Primary Examiner*—Bruce Y. Arnold
*Assistant Examiner*—Martin Lerner
*Attorney, Agent, or Firm*—Jacob N. Erlich; Donald J. Singer

[57] ABSTRACT

A modified 2f Fourier transform optical correlator combines a collimation and first Fourier Transform lens into one thin lens. The resulting correlator thus utilizes one less lens relative to the unmodified 2f optical correlator.

10 Claims, 2 Drawing Sheets

MODIFIED COMPACT 2F OPTICAL CORRELATOR

STATEMENT OF GOVERNMENT INTEREST

The invention described herein may be manufactured and used by or for the Government for governmental purposes without the payment of any royalty thereon.

BACKGROUND OF THE INVENTION

The classical coherent optical correlator is usually configured as a system with a linear dimension of 4f, where f is the focal length of each of the two Fourier transform (FT) lenses. This configuration is shown in FIG. 1, where $P_1$ is the input plane, $L_1$ is the first FT lens with focal length $f_1$, $P_2$ is the Fourier or filter plane, $L_2$ is the inverse FT lens with focal length $f_2$, and $P_3$ is the output or correlation plane. The focal length of the FT lenses must be selected according to the wavelength of light used and the size of the input object at $P_1$ and the filter at $P_2$. Frequently, spatial light modulators (SLMs) are used in both planes $P_1$ and $P_2$ for real time processing, using phase-only filter technology. See J. L. Horner and P. D. Gianino, "Phase-Only Matched Filtering," Appl. Opt. 23, 812–816 (1984) and J. L. Horner and J. R. Leger, "Pattern Recognition with Binary Phase-Only Filter," Appl. Opt. 24 609–611 (1985). See also U.S. Pat. No. 4,765,714 to Horner. It has been shown that the focal length of lens $L_1$ must be $$f_1 = \frac{N_2 d_1 d_2}{\lambda}, \qquad (1)$$

where $f_1$ is the required focal length of the first FT lens, $d_1$ and $d_2$ are the pixel size of the SLM in the input and filter planes, $N_2$ is the number of pixels in the filter SLM, and $\lambda$ is the wavelength of light. For example, for the "Semetex" (TM) 128×128 Magneto-Optic SLM, $N_2=128$, $d_1=d_2=76$ m, =632.8 nm (He-Ne), and Eq. (1) gives a focal length $f_1$ of 117 cm, or a 4f length of over 4.5 m which is too long to be practical.

Flannery et al. proposed a system using two-element telephoto lenses for $L_1$ and $L_2$ that reduced the basic correlator length to 2f. See D. L. Flannery et al., "Real-Time Coherent Correlator Using Binary Magnetooptic Spatial Light Modulators at Input and Fourier Planes," Appl. Opt. 25, 466 (1986). The system had another desirable feature in that it allowed the scale of the Fourier transform to be continuously varied, thus allowing for an exact size match between the input and filter SLM and compensating for any errors in measuring the focal length of the actual lenses used. VanderLugt also considered the information storage capacity of a 2f holographic system. See A. VanderLugt, "Packing Density in Holographic Systems," Appl. Opt. 14, 1081–1087 (1975).

SUMMARY OF PREFERRED EMBODIMENTS OF THE INVENTION

The 2f optical correlator of the present invention, uses two simple, single element lenses in a configuration similar to the 3f system to be described, but with the second lens performing both quadratic phase removal and the inverse Fourier transform operation in a more compact two-focal-length space. This correlator retains the aforesaid highly desirable scale feature and produces good correlation results.

The 2f correlator also employs a collimating lens which directs collimated light at the first Fourier transform lens of the correlator. In accordance with the present invention, the collimating lens is eliminated by combining these lenses into a single lens having a focal length computed by employing the thin lens combination formula to be described.

BRIEF DESCRIPTION OF THE DRAWINGS

Other objects, features, and advantages of the invention will become apparent upon study of the following description taken in conjunction with the drawings in which.

DETAILED DESCRIPTION OF THE INVENTION

Figure 1:
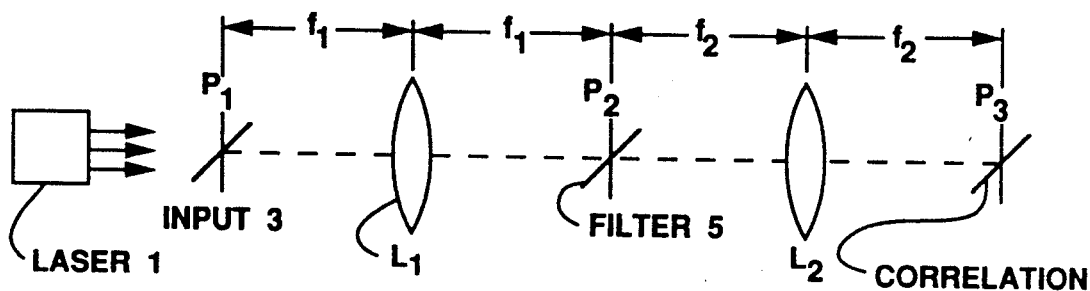
FIG. 1 illustrates a prior art 4f correlator.
Figure 2:
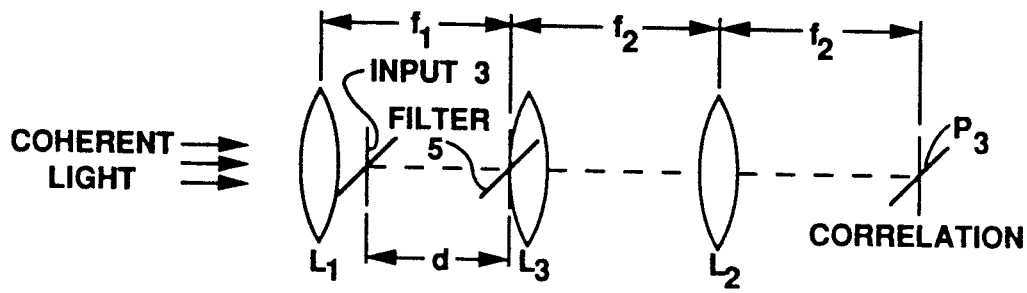
FIG. 2 illustrates a 3f correlator.

The 4f prior art optical correlator of FIG. 1, uses the four optical focal lengths of its two FT lenses to match an input object at $P_1$ (film or SLM) against its conjugate filter in the frequency plane $P_2$ for a correlation output at $P_3$. The 3f system uses an extra lens $L_3$ but is shorter by one optical focal length as shown in FIG. 2. By placing the input object 3 behind the first lens $L_1$, the scale of the input object Fourier transform at the filter plane 5 is proportional to d as $$A(x_2, y_2) = \exp\left[\frac{jK}{2d}(x_2^2 + Y_2^2)\right] F(f_{x2}, f_{y2}), \qquad (2)$$

where we omitted unimportant constants. In Eq. (2), $A(x_2,y_2)$ is the FT amplitude distribution of the input object in the filter plane $P_2$, k is the wavenumber and equals $2\pi/\lambda$, d is the distance between input object and filter plane, $F(f_{x2},f_{y2})$ is the Fourier transformation of the input object, and $f_{x2,y2}$ are the spatial frequencies and equal to $(x_2,y_2)/\lambda F$. The first factor in Eq. (2), exp $$[jK/2d(X_2^2 + Y_2^2)],$$

is a wavefront distorting quadratic phase term due to this configuration. Lens $L_3$ is the phase compensation lens used to remove this distorting positive quadratic phase term present at the filter plane. It is placed close to and behind the filter and should have a focal length $f_3$ equal to d because it introduces a negative phase factor, exp $$[-jK/2f_3(X_2^2 + Y_2^2)],$$

at that plane. Lens $L_2$ functions, as in the 4f system, by inverse Fourier transforming the disturbance behind the filter plane, which equals the product of the input object Fourier transform, filter function, and phase distortion contribution into a correlation signal in correlation plane $P_3$.

Figure 3:
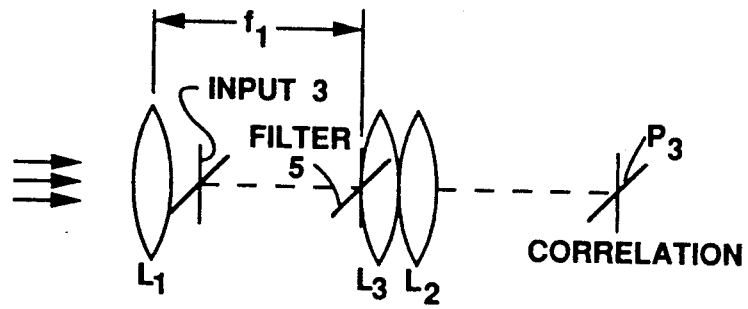
FIG. 3 conceptually illustrates combining 2 lenses into one lens.
Figure 4:
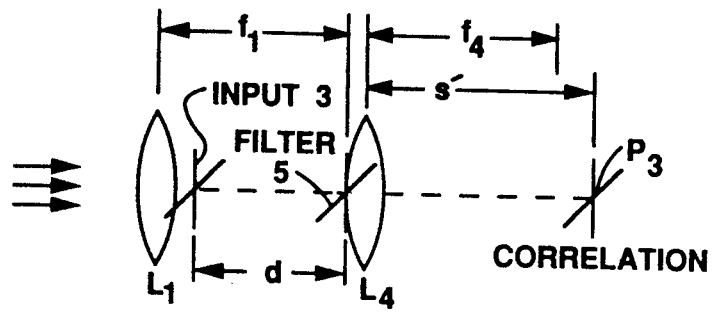
FIG. 4 illustrates a two lens 2f correlator.

To proceed to a 2f system, we know that in the correlation plane we physically observe light intensity and not amplitude. Therefore, any arbitrary phase factor appearing with the correlation signal is not observable. Referring to FIG. 3, if we move lens $L_2$ to the left until it is against lens $L_3$, we introduce a phase factor, exp $$[jK/2f_2(X_3^2 + Y_3^2)],$$

at the correlation plane. We can then combine lenses $L_2$ and $L_3$ in FIG. 3 into one lens $L_4$ as shown in FIG. 4, to make the 2f system. We assume two thin lenses in contact to use the relationship $1/f_4 = 1/f_2 + 1/f_3$, where $f_{2,3}$ are the focal lengths of the lenses used in the 3f system and $f_4$ is the equivalent focal length required. We then locate the correlation plane $P_3$ position for the 2f system by using the Gaussian lens formula, $1/f_4 = 1/s + 1/s'$, where s and s' are the input object and image distances from lens L4, respectively, and s is equal to d. Here we solve for s' because with this configuration and no filter, we have an imaging system with its associated output image plane at $P_3$. We can verify this position by adjusting the output image detector in $P_3$ until the input image is in focus. We did this in the laboratory and experimental results agree with the above theory.

Experimental autocorrelation results for the 2f configuration of FIG. 4 were very good compared with the 3f and 4f configurations, using a binary phase-only filter etched on a quartz substrate. See M. Flavin and J. Horner, "Correlation Experiments with a Binary Phase-Only Filter on a Quartz Substrate," Opt. Eng 28, 470-473 (1989). The correlation plane peak intensity was digitized using a CCD camera and a frame grabber board and stored as a 512×512-byte, 256-level gray scale image array. After uploading this image into a VAX 8650 equipped with IDL software, we obtained SNR information and an intensity surface plot. IDL, Interactive Data Language, software is marketed by Research Systems, Inc. 2001 Albion St., Denver, Colo., 90207. We define SNR (signal to noise ratio):

$$SNR = \frac{I_{MAX}}{RMS(I < 0.5\, I_{MAX})} \quad (3)$$

where I is the intensity distribution at the correlation plane. The SNR for the experimental setup intensity data measured 15.4, while a computer simulation yielded a SNR of 228.4. The difference between theoretical and experimental SNR values is primarily due to sources of error, such as input object film nonlinearity and the absence of a liquid gate around the input object transparency. Although the SNR numbers differ substantially, a simple peak detector has no problem detecting the experimental correlation peak.

THE MODIFIED 2F CORRELATOR OF THE PRESENT INVENTION

We constructed our FIG. 4 correlator with a microscopic objective lens 9, aligned with a pinhole 8 formed within opaque plate 10. A collimating lens Lc, not shown in FIG. 4, had been used to collimate light emerging from the pinhole and directing the collimated light at lens L1, as shown in FIGS. 5 and 6.

Figure 5:
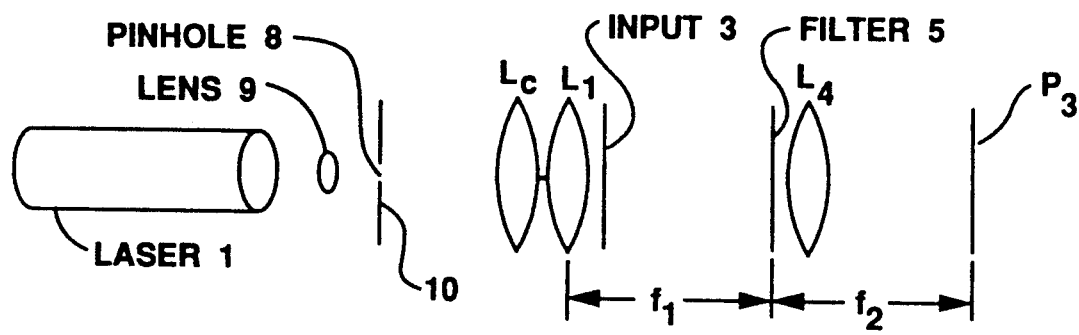
FIG. 5 illustrates "displacement" of the 2f correlator.
Figure 6:
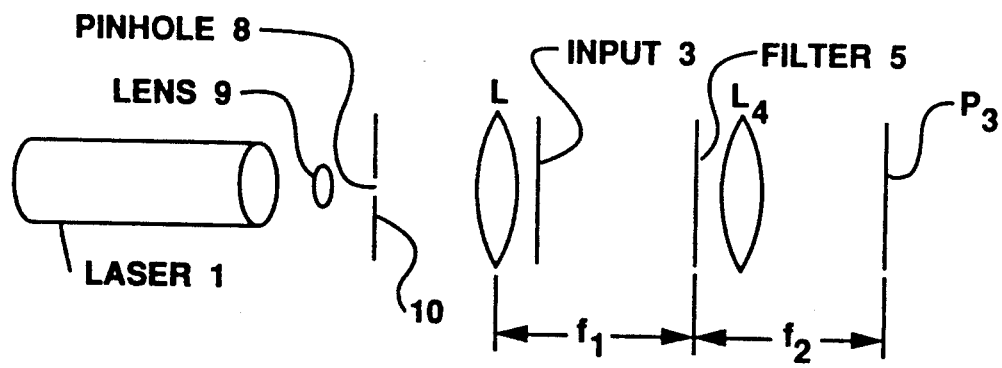
FIG. 6 illustrates the modified 2f correlator of the present invention.

After several months of working with the 2f correlator of FIG. 4, it occurred to us that since the collimated light rays are parallel to the right of the collimation lens Lc, we could move the entire 2f correlator to the left, until the first Fourier transform lens L1 touches the collimation lens Lc as illustrated in FIG. 5.

We then use the thin lens combination formula $(1/L_5 = 1/L_c + 1/L_1)$ to combine these two lenses and replace them with a single lens element $L_5$, eliminating one lens from the system. The final modified system is shown in FIG. 6. Note that our correlator no longer uses collimated light but we have a virtual collimation at lens $L_5$.

In practice, one does not generally have the exact required lenses on hand so care must be taken to employ this system. Suppose the collimation lens has a focal length of 20 cm and the FT lenses of the 4f system are 50 cm. Using the lens combination formula, the single lens, $L_5$ that is located in place of the collimation/first FT lens is 14.28 cm, not a typically stocked lens. Suppose the closest lens you have to 14.28 cm is 12 cm and you need to maintain the 50 cm input to filter distance (proper scale) because of the pixel size of the spatial light modulator you are using in the filter plane. We now have two variables, the collimation and FT lens focal length combination to give 12 cm. Let us pick the FT lens length to be 55 cm giving a variable scale factor of ±10% on both sides of the exact required distance of 50 cm. Using the lens combination formula and solving for the collimation lens focal length we find its value is 15.35 cm. Lens $L_5$ (FIG. 6) should be placed 15.35 cm from the pinhole and the filter 55 cm from this lens. The input object is located 5 cm from the lens (50 cm from the filter) and can be adjusted for exact scale.

The same reasoning can be applied to the compensation/second FT lens. The thin lens combination of the required 50 cm compensation lens (50 cm from input to filter) and 50 cm FT lens is 25 cm, but you only have a 10 cm lens on hand for $L_4$. Knowing the compensation portion must stay at 50 cm, the calculated FT lens must be 12.5 cm. The correlation is found 12.5 cm behind $L_4$. Because correlators without filters are imaging systems and there is not a lens between the input and $L_4$, we can also use simple geometrical optics to calculate the position of the correlation plane. Using the Gaussian lens formula, $1/f = 1/S_i + 1/S_o$ and substituting 10 cm for f and 50 cm for $s_o$, si, is 12.5 cm as above (FIG. 4). One can easily see an endless combination of possibilities for choosing the parameters to suit the problem and equipment on hand. The only pitfall we see is if the combined lens for the input stage is not large enough, the illumination spot size may not cover the entire input. However, increasing the objective strength in the lens-pinhole spatial filter will usually solve this problem.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. In an optical correlation system comprising:
    (a) first Fourier transform lens means for taking the Fourier transform of a first signal representing an input image and forming said Fourier transform at a first position along an optical axis;
    (b) a filter located at said first position providing information obtained from a second signal which is to be correlated with said first signal;
    (c) second Fourier transform lens means in optical alignment with said filter for taking the inverse Fourier transform of the product of the Fourier transform of said first signal, and said information of said second signal, and for forming said inverse Fourier transform at a second position along said optical axis, said inverse Fourier transform being substantially equivalent to the mathematical correlation function between said first signal and said second signal;

(d) input signal producing means for producing said first input signal behind said first Fourier transform lens to introduce a wavefront distortion quadratic phase term; and (e) means for positioning said second Fourier transform lens means behind said filter, said second Fourier transform lens means having a focal length which removes said quadratic phase term from said wavefront while concurrently inverse Fourier transforming the disturbance behind the filter to produce a correlation signal at said second position;

(f) a collimating lens positioned in front of said first Fourier transform lens means for directing collimated coherent light thereat;

(g) the improvement comprising combining said collimating lens means with said Fourier transform lens means to produce a single Fourier transform lens means having a focal length about equal to $f_5$ where $f_5$ is determined by solving the equation $1/f_5 = 1/f_c = 1/f_1$;

Where $f_c$ equals the focal length of said collimating lens means and $f_1$ equals the focal length of said first Fourier transform lens means.

2. The improvement set forth in claim 1 wherein said single Fourier transform lens means consists essentially of a single simple thin lens.

3. The correlation system of claim 2 wherein said filter is a binary phase only filter.

4. The system of claim 2 wherein said second Fourier transform lens means is equivalent to a second and third thin lens in contact with one another and wherein the combined focal length of said second and third thin lenses is equal to the distance between said filter and said input signal producing means.

5. The correlation system of claim 4 wherein said filter is a binary phase only filter.

6. The system of claim 1 wherein said first and second Fourier transform lens means each consists essentially of a simple single element optical lens.

7. The correlation system of claim 6 wherein said filter is a binary phase only filter.

8. The system of claim 1 wherein said second Fourier transform lens means is equivalent to a second and third thin lens in contact with one another and wherein the combined focal length of said second and third thin lenses is equal to the distance between said filter and said input signal producing means.

9. The correlation system of claim 8 wherein said filter is a binary phase only filter.

10. The correlation system of claim 1 wherein said filter is a binary phase only filter.

* * * * *